(12) United States Patent
Ranalli

(10) Patent No.: US 7,889,991 B2
(45) Date of Patent: Feb. 15, 2011

(54) PLANAR LIGHTWAVE CIRCUIT BASED TUNABLE 3 PORT FILTER

(75) Inventor: Eliseo Ranalli, Irvine, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 553 days.

(21) Appl. No.: 12/029,322

(22) Filed: Feb. 11, 2008

(65) Prior Publication Data

US 2008/0193134 A1 Aug. 14, 2008

Related U.S. Application Data

(60) Provisional application No. 60/889,439, filed on Feb. 12, 2007.

(51) Int. Cl.
*H04J 14/02* (2006.01)
*G02B 6/35* (2006.01)

(52) U.S. Cl. .............................. 398/85; 398/82; 398/83; 398/84; 398/86; 398/87; 385/16; 385/18; 385/37

(58) Field of Classification Search .............. 398/82–88
See application file for complete search history.

(56) References Cited

U.S. PATENT DOCUMENTS

| 4,707,056 | A  | * | 11/1987 | Bittner | 385/31 |
|---|---|---|---|---|---|
| 5,002,350 | A  | * | 3/1991 | Dragone | 385/24 |
| 6,266,460 | B1 |   | 7/2001 | Doerr | 385/16 |
| 6,438,288 | B1 | * | 8/2002 | Tehrani | 385/27 |
| 6,714,704 | B2 | * | 3/2004 | Lin et al. | 385/37 |
| 6,728,041 | B2 |   | 4/2004 | Chang et al. | 359/634 |
| 6,801,679 | B2 |   | 10/2004 | Koh et al. | 385/14 |
| 6,823,097 | B2 |   | 11/2004 | Glebov et al. | 385/16 |
| 7,027,684 | B2 | * | 4/2006 | Ducellier et al. | 385/24 |
| 7,072,539 | B2 | * | 7/2006 | Wu et al. | 385/18 |
| 7,190,856 | B1 | * | 3/2007 | Iazikov et al. | 385/24 |
| 7,257,285 | B2 |   | 8/2007 | Doerr et al. | 385/18 |
| 7,440,650 | B2 | * | 10/2008 | Fondeur et al. | 385/18 |
| 7,760,974 | B2 | * | 7/2010 | Lee et al. | 385/37 |
| 2004/0131360 | A1 | * | 7/2004 | Iazikov et al. | 398/83 |
| 2004/0145810 | A1 | * | 7/2004 | Ranalli | 359/569 |
| 2004/0151432 | A1 | * | 8/2004 | Tabuchi et al. | 385/37 |
| 2004/0165817 | A1 | * | 8/2004 | Nakagawa et al. | 385/24 |

(Continued)

OTHER PUBLICATIONS

"All-Optical Signal Processing and Routing with Spectral Control by a High-Resolution Arrayed-Waveguide Grating" by Tsuda et al. Photonics Based on Wavelength Integration and Manipulation, IPAP Books 2 (2005) pp. 331-340.

(Continued)

*Primary Examiner*—Ken N Vanderpuye
*Assistant Examiner*—Tanya Ngo
(74) *Attorney, Agent, or Firm*—Matthew A. Pequignot; Pequignot + Myers LLC

(57) ABSTRACT

The invention relates to a tunable optical add/drop module (TOADM) monolithically integrated on a single planar lightwave circuit (PLC). The present invention overcomes the shortcomings of the prior art by providing virtual pupils at the interface between the channel waveguides and the slab waveguide on the PLC for focusing each wavelength channel, and additional on-chip lenses on the PLC for transforming the focal plane of the spatially dispersive demultiplexer into a substantially flat plane at the edge of the PLC. On-chip lenses are realized as reflective surfaces within slab waveguiding regions having a surface curvature to provide optical power.

12 Claims, 7 Drawing Sheets

U.S. PATENT DOCUMENTS

| | | | |
|---|---|---|---|
| 2004/0208584 A1* | 10/2004 | Keller | 398/88 |
| 2004/0252938 A1* | 12/2004 | Ducellier et al. | 385/27 |
| 2005/0018951 A1* | 1/2005 | Mossberg et al. | 385/14 |
| 2005/0025415 A1* | 2/2005 | Takushima et al. | 385/27 |
| 2006/0066855 A1* | 3/2006 | Boef et al. | 356/401 |
| 2006/0257091 A1* | 11/2006 | Tabuchi et al. | 385/132 |
| 2007/0041683 A1* | 2/2007 | Keyworth | 385/24 |
| 2007/0230871 A1* | 10/2007 | Bidnyk et al. | 385/37 |
| 2007/0237451 A1* | 10/2007 | Colbourne | 385/18 |
| 2008/0019640 A1* | 1/2008 | Blum | 385/37 |
| 2008/0031570 A1* | 2/2008 | Fondeur et al. | 385/18 |
| 2008/0088928 A1* | 4/2008 | Tedesco | 359/566 |

OTHER PUBLICATIONS

"Arrayed-waveguide grating with wavefront compensation lenses for spatial filter integration" by Yasumoto et al. IEICE Electronics Express, vol. 3, No. 11, pp. 221-226. Jun. 10, 2006.

"Dispersion compensator using a compact arrayed-waveguide grating with a dispersion-adjusting structure" by Suzuki et al. IEICE Electronics Express, vol. 3, No. 3, pp. 58-63. Feb. 10, 2006.

"Planar lightwave circuit dispersion compensator using a compact arrowhead arrayed-waveguide grating" by Suzuki et al. IEICE Electronics Express, vol. 2, No. 23, pp. 572-577. Dec. 10, 2005.

* cited by examiner

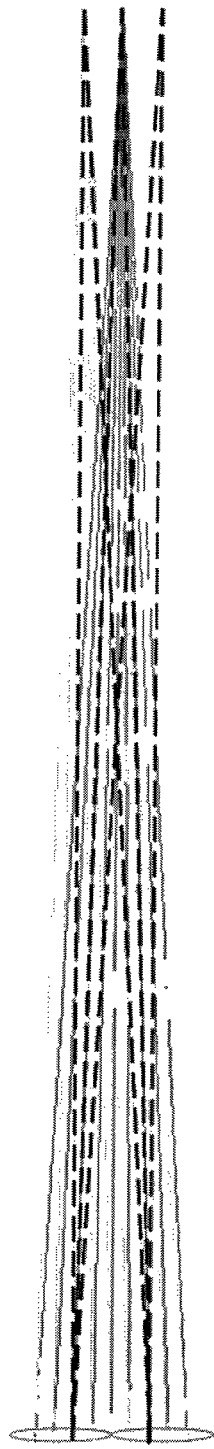
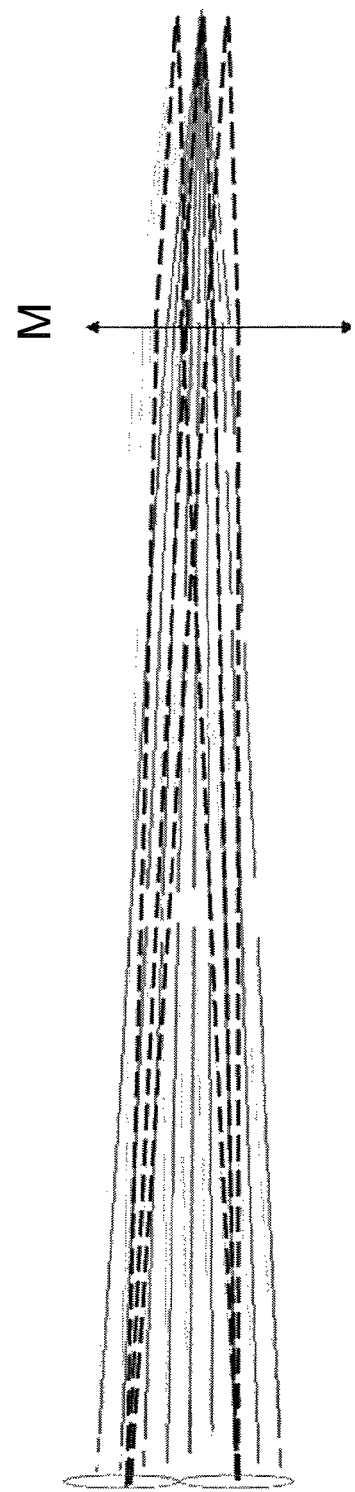

US 7,889,991 B2

PLANAR LIGHTWAVE CIRCUIT BASED TUNABLE 3 PORT FILTER

CROSS-REFERENCE TO RELATED APPLICATIONS

This application claims priority of U.S. Provisional Patent Application No. 60/889,439 filed Feb. 12, 2007, entitled "PLC-BASED TUNABLE 3-PORT FILTER" which is incorporated herein by reference for all purposes.

TECHNICAL FIELD

The present invention relates to a wavelength selective device based on planar lightwave circuit (PLC) technology. In particular, the present invention relates to a tunable optical add/drop module (TOADM) monolithically integrated on a single PLC.

BACKGROUND OF THE INVENTION

Prior art wavelength selective devices are constructed with discrete structures coupled through free space. This type of assembly suffers a number of limitations. Optical alignment of the elements is highly sensitive and costly to produce. In the interests of reliability and robustness to environmental factors, it is desirable to perform as many of the required functions as possible on a monolithically integrated planar lightwave circuit. (PLC).

Planar lightwave circuits (PLC) are constructed as lithographically formed waveguides on a planar substrate. The waveguides are surrounded by a lower index cladding material for confining optical signal within the waveguide circuit. PLCs are frequently constructed as silica on silicon assemblies in which a silicon substrate is deposited with a silica lower cladding, waveguide cores of germanium doped silica are formed and an upper cladding of borophosphosilicate glass is deposited over the waveguide cores. Alternatively, PLCs are formed in InGaAsP or optically transmissive polymer or glass. Structures formed in the PCL include channel waveguides which confine the signal in two dimensions orthogonal to the direction of light propagation, and slab regions which confine the optical signal in one dimension and allow a wavefront to spread over a defined region in the orthogonal dimension. In optical communications, the dimensions are typically confined to single mode transmission.

A typical demultiplexer for separating the multiplexed optical beam is an arrayed waveguide diffraction grating (AWG) constructed as a PLC. The AWG was invented by Dragone by combining a dispersive array of waveguides with input and output "star couplers" on a planar lightwave circuit chip. The AWG can work both as a DWDM demultiplexer and as a DWDM multiplexer, as taught by Dragone in U.S. Pat. No. 5,002,350 (March 1991). Other dispersion devices such as echelle gratings can also be realized in PLC for the multiplexing/demultiplexing functions.

U.S. Pat. No. 7,027,684 issued Apr. 11, 2006 to Ducellier et al, and United States Patent Publication No. 2004/0252938 published Dec. 16, 2004 to Ducellier et al relate to single and multi-layer planar lightwave circuit (PLC) wavelength selective switches (WSS), respectively, which are illustrated in FIGS. 1 and 2. A single level device 1, illustrated in FIG. 1, includes a PLC 2 with an input AWG in the middle, and a plurality of output AWG's on either side of the input AWG. An input optical signal launched into the input AWG is dispersed into constituent wavelengths, which are directed at different angles through lensing 3 to an array of tiltable mirrors 4. The light is collimated in one direction, e.g. vertically, by a first cylindrical lens 5 adjacent to the PLC 2, while a cylindrical switching lens 6 focuses the output light in the horizontal direction onto the tiltable mirrors 4. Each wavelength channels falls onto a different one of the tiltable mirrors 4, which redirect the individual wavelength channels back through the lensing 3 to whichever output AWG is desired for recombination, and output an output port. For the single level device the tiltable mirrors 4 rotate about a single axis to redirect the wavelength channels within the dispersion plane, i.e. the plane of the PLC 2.

A two level device 11, illustrated in FIG. 2, includes a second PLC 12, similar to the PLC 2, superposed above the PLC 2 with a plurality of input or output AWG's and ports. A second cylindrical lens 15 is superposed above the first cylindrical lens 5 for focusing the beams of light onto the output AWG's provided on the second PLC 12. For the two-level device, tiltable mirrors 14 rotate about two perpendicular axes to redirect the wavelength channels within the dispersion plane (as above) and at an acute angle to the dispersion plane into a plane parallel to the dispersion plane, i.e. the plane of the PLC 12.

In the aforementioned Ducellier devices, the AWG's terminate in straight linear arrays at the edge of the chip, whereby without the curvature at the AWG outputs, the "foci" occur at infinity. Accordingly, an external, bulk-optic lens is required to function as more than simply a field lens, but as a full (spatially) Fourier transforming lens. Consequently, not only is the external lens required to be extremely well aligned, i.e. relatively expensive and extremely sensitive to misalignments, but the optical path is necessarily mostly in air.

An object of the present invention is to provide a tunable add/drop filter in a monolithic PLC.

A further object of the present invention is to overcome the shortcomings of the prior art by providing virtual pupils at the interface between the channel waveguides and the slab waveguide on the PLC for focusing each wavelength channel. A further lens system comprises a plurality of on-chip lenses on the PLC for transforming the focal plane of the spatially dispersive demultiplexer into a substantially flat plane at the edge of the PLC. On-chip lenses are realized as reflective surfaces within slab waveguiding regions having a surface curvature to provide optical power.

SUMMARY OF THE INVENTION

Accordingly, the present invention relates to a tunable add/drop filter in a planar lightwave circuit (PLC) comprising:

an input port for launching an input optical signal comprising a plurality of wavelength channels into the PLC;

a first demultiplexer with an input pupil and an output pupil for spatially separating the input optical signal into the wavelength channels;

a slab waveguide region comprising a high-index core layer, surrounded above and below by lower-index cladding layers for transmitting the separated wavelength channels from the first demultiplexer to an add/drop port;

a lens system in the slab waveguide region for focusing the plurality of separated wavelength channels from the output pupil of the first demultiplexer onto straight line at an edge of the PLC, a separate reflector adapted for transverse movement along the edge of the PLC for reflecting the separated wavelength channels;

an add/drop port within a transmissive window within the reflector for receiving one or more of the separated wavelength channels as a drop port, or for inputting a new wavelength channel as an add port, the add/drop port being tunable as a function of transverse motion of the transmissive window along the separated wavelength channels focused at the edge of the PLC;

a second demultiplexer with an input pupil optically coupled with the reflector and the add/drop port for receiving and multiplexing the one or more wavelength channels reflected by the reflector and any new wavelength channel input at the add port from the lens system in the slab waveguide region, and an output pupil; and an output port optically coupled to the output pupil of the second demultiplexer for outputting the multiplexed wavelength channels;

wherein the output pupil of the first demultiplexer is positioned with respect to the input pupil of the second demultiplexer, such that at least one wavelength channel focused on the reflector is optically coupled into the input pupil of the second demultiplexer.

Another feature of the present invention provides that the first demultiplexer and the second demultiplexer comprise arrayed waveguide gratings.

A further feature of the present invention provides that the spatially separated wavelength channels of the first demultiplexer and the second demultiplexer are in reflective communication along a common circle.

A further feature of the present invention defines the lens system in the slab waveguide region as a telecentric lens system.

A further feature of the present invention provides that chief rays of each reflected wavelength channel are incident on the reflector at equal angles.

Another aspect of the present invention relates to a tunable add/drop filter in a planar lightwave circuit (PLC), wherein the lens system comprises at least one reflective surface within a slab waveguiding region, the reflective surface having a curvature to impart optical power.

A further aspect of the present invention includes the reflector comprising a separate PLC including an add/drop port waveguide disposed in the transmissive window.

In a further embodiment of the present invention, the reflector PLC includes the add/drop port waveguide comprising a Mach-Zehnder interferometer.

BRIEF DESCRIPTION OF THE DRAWINGS

The invention will be described in greater detail with reference to the accompanying drawings which represent preferred embodiments thereof, wherein:

FIG. 6A is an illustration of the optical fields exiting the pupils AO1 and AO2 without additional lenses;

FIG. 6B is an illustration of the optical fields exiting the pupils AO1 and AO2 corrected by a field lens as realized in accordance with the present invention;

DETAILED DESCRIPTION

Figure 1:
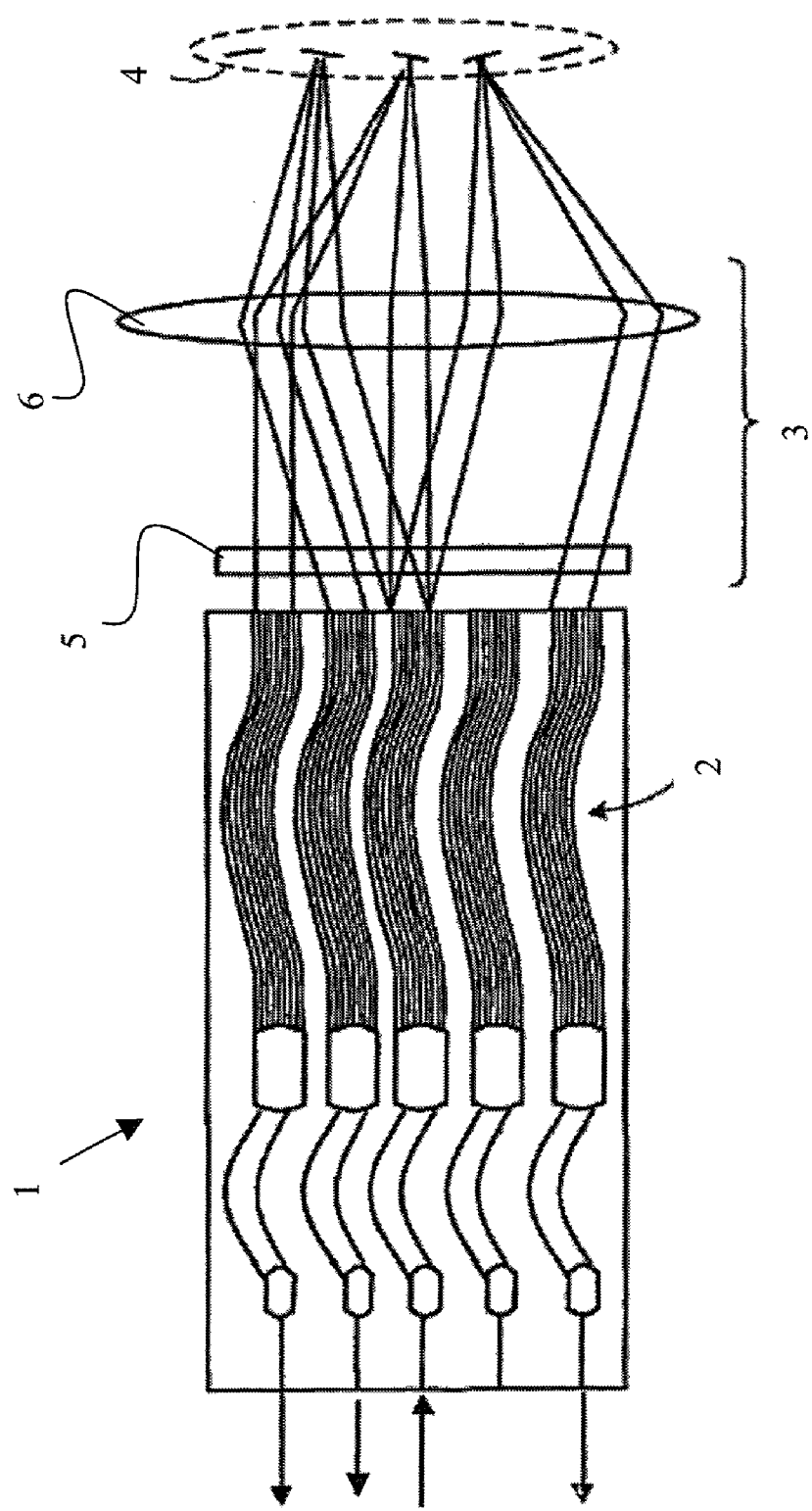
FIG. 1 is a plan view of a prior art PLC based wavelength selective switch.
Figure 2:
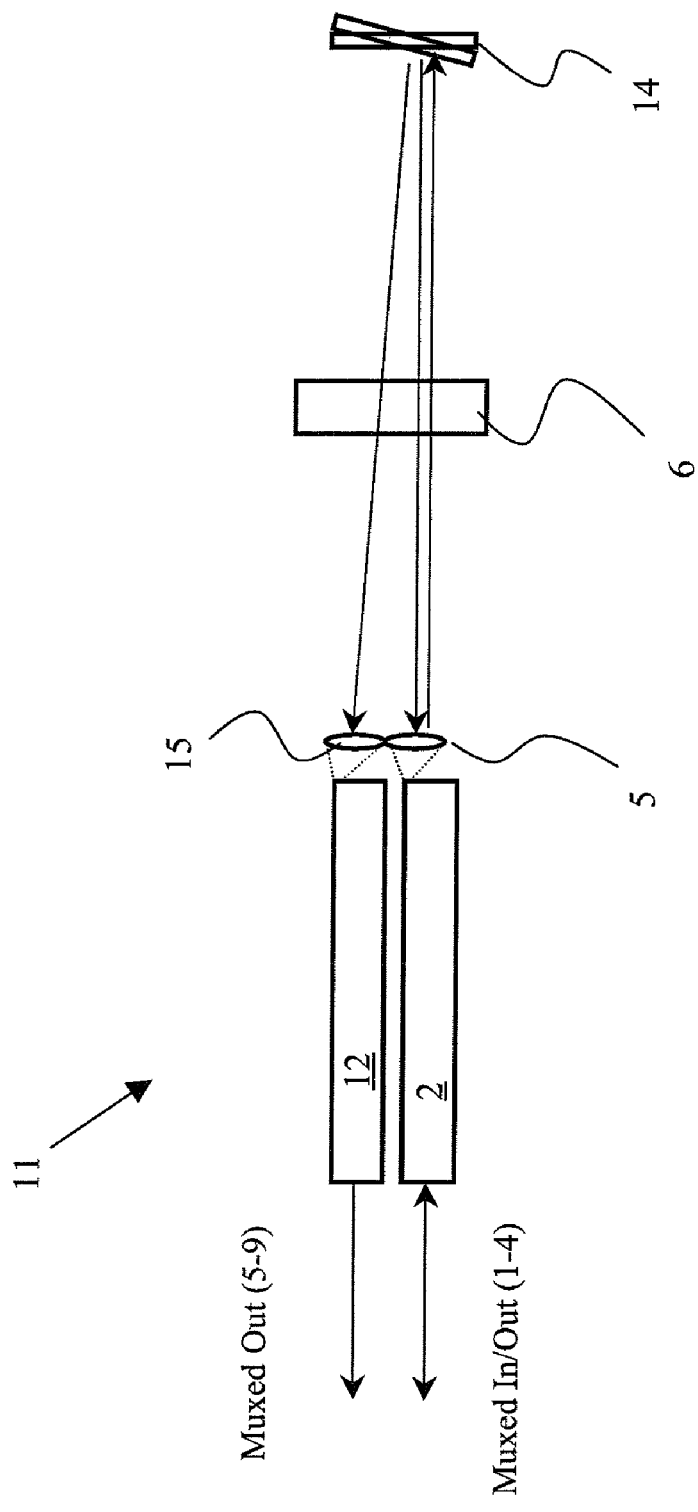
FIG. 2 is a side view of a prior art multi-layer PLC based wavelength selective switch.
Figure 3:
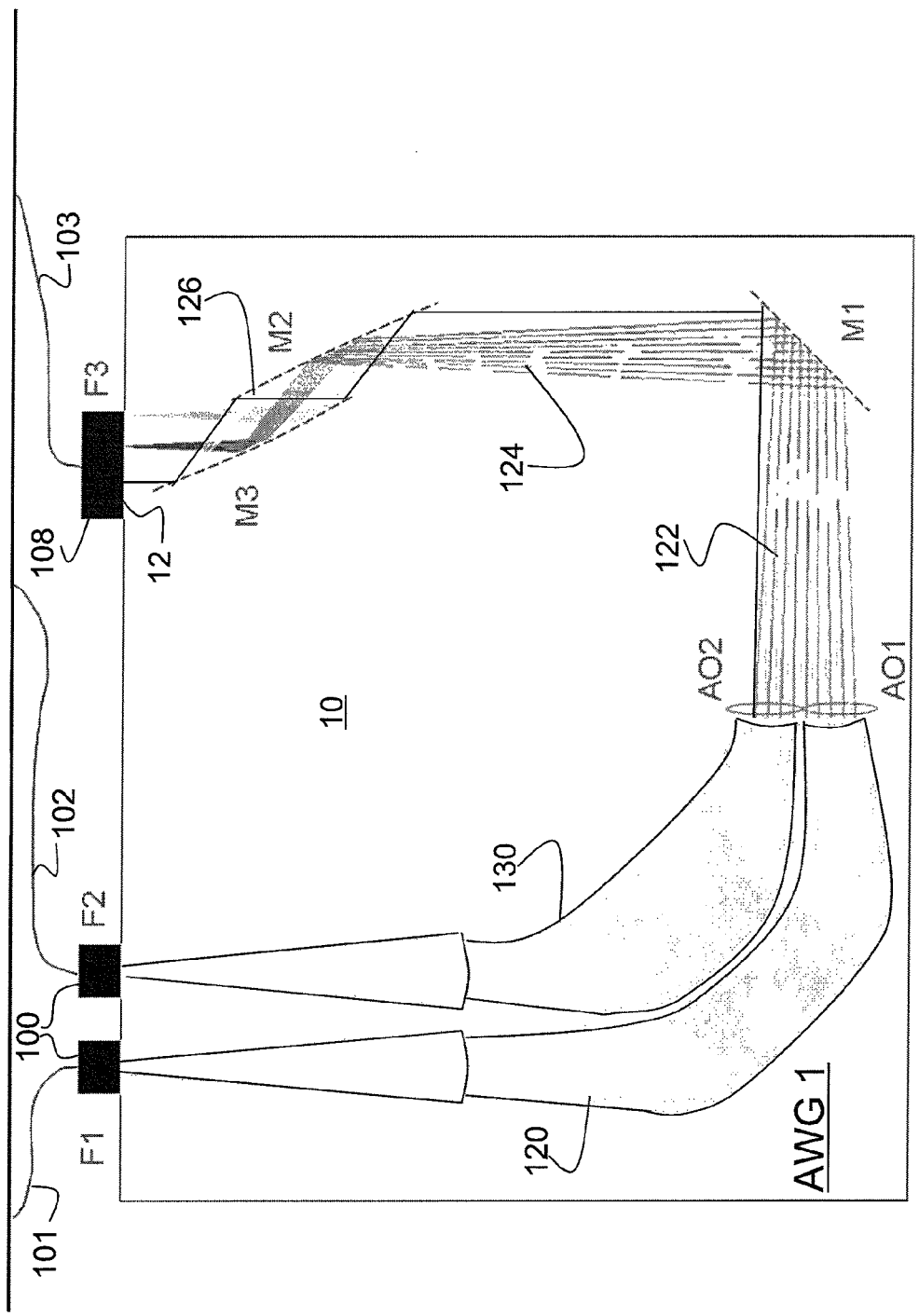
FIG. 3 is a plan view of a PLC based tunable 3 port add/drop filter in accordance with the present invention.

The present invention as illustrated in FIG. 3 relates to a 3-port tunable filter in a monolithic PLC 10, comprising an INPUT port F1 (i.e. single-mode fiber), an OUTPUT port F2 and an ADD/DROP port F3. The functionality of the device is such that a given wavelength division multiplexed (WDM) channel can be selected, and that channel can either be a) Added through the ADD/DROP port F3 to a signal launched via the input port F1 for output the OUTPUT port F2, or b) dropped through the ADD/DROP port F3 from a signal launched via the INPUT port F1, while any remaining channels are output the output port F2.

It is assumed that these functions are mutually exclusive, so that one or the other function is assigned to the ADD/DROP port, but not both simultaneously. All other channels not selected are passed directly from the INPUT port F1 to the OUTPUT port F2 (the so-called EXPRESS configuration), with minimal attenuation.

A nearly monolithic planar implementation of this device is shown schematically in FIG. 3. The PLC chip 10 is outlined in black. The elements within the chip 10 will be described in detail below. The fibers 101, 102, 103 representing the 3 ports F1, F2, F3 are connected optically to the chip 10 via either fiber ferrules or other PLC chips, as will be explained below. Such fiber/chip interface structures 100 are indicated schematically by the rectangles. If the desired functionality of the device conforms to option a), as described in the last paragraph, then F3 represents the ADD port, and for option b) F3 represents the DROP port.

The optical signals emanating from the fiber-pigtailed INPUT F1 and OUTPUT F2 ports are transmitted through their respective arrayed-waveguide grating (AWG) structures AWG 1 120 and AWG 2 130, exiting the arrays at the indicated pupils, AO1 (Array Output 1) and AO2. The AWGs 120, 130 separate and combine the wavelength components of these optical signals. Viewing AO1 and AO2 as sub-pupils of a larger, common pupil, these wavelength-separated fields are then telecentrically focused to an interface plane 12 at F3 on the edge of the chip 10, via the natural focusing of the AWG outputs, which lies on a common circle for both AWGs, and a series of curved mirror surfaces, indicated by M1, M2 and M3. A preferred embodiment of the invention invokes total internal reflection (TIR) at an etched glass-air interface M1, M2, M3, as was assumed in the optimization for the design represented in FIG. 3. Similar pupil structures are disclosed in U.S. Patent Publication No. 2008/0031570 published Feb. 7, 2008, which is incorporated herein by reference.

Figure 7:
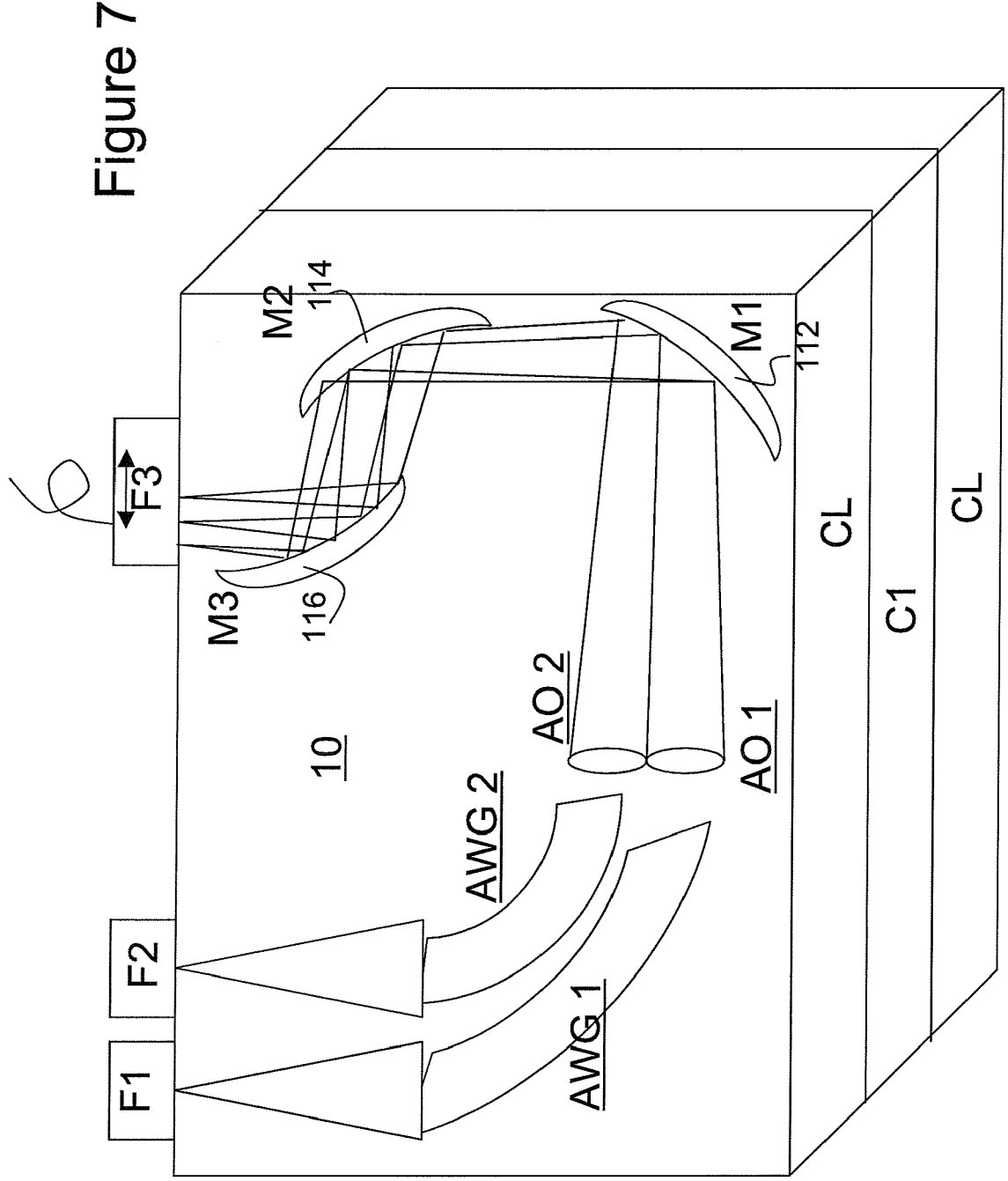
FIG. 7 is a schematic illustration of the 3 port tunable add/drop filter as shown in FIG. 3, schematically illustrating the layer structure of the PLC and the curved lenses M1, M2 and M3.

The focusing lenses M1, M2 and M3 can be lithographically defined, in the same manner and mask step as the Rowland circle and channel waveguides comprising the AWG arrays. Specifically, the regions 122, 124, 126, in which rays appear in the figures, correspond to slab waveguide areas, terminating at the curved interfaces represented by M1, M2 and M3. As shown schematically in FIG. 7, on the slab side of the interface one will find the usual slab waveguide strata, i.e. high-index core layer Cl, surrounded above and below by lower-index cladding layers CL, and on the other side of the interface, at regions 112, 114, 116 those layers are etched away. Thus, the slab regions 122, 124, 126 interface to either air (for a purely total internal reflection interface) or a metalized interface (requiring another deposition step). These etched regions 112, 114, 116 can also be filled with other low index material.

The geometries for the reflective surfaces M1, M2, M3 focusing lenses are precisely the same as those that would be considered for off-axis telescopes, subject to the constraint that all angles of incidence are greater than the critical angle for total internal reflection. If there were only a single field, e.g. collimating the output of a single waveguide, or coupling a single waveguide to another single waveguide, then only one reflecting surface would be required, and being lithographically defined, it can be as complicated as design requires for an arbitrarily large pupil.

On the other hand, as in the case of the 3-port TOADM according to the present invention, to accommodate multiple field angles, a single reflector is insufficient, and—as with optical designs in general—more elements, each of which provides less bending of rays, hence lower aberrations, are required.

Figure 4:
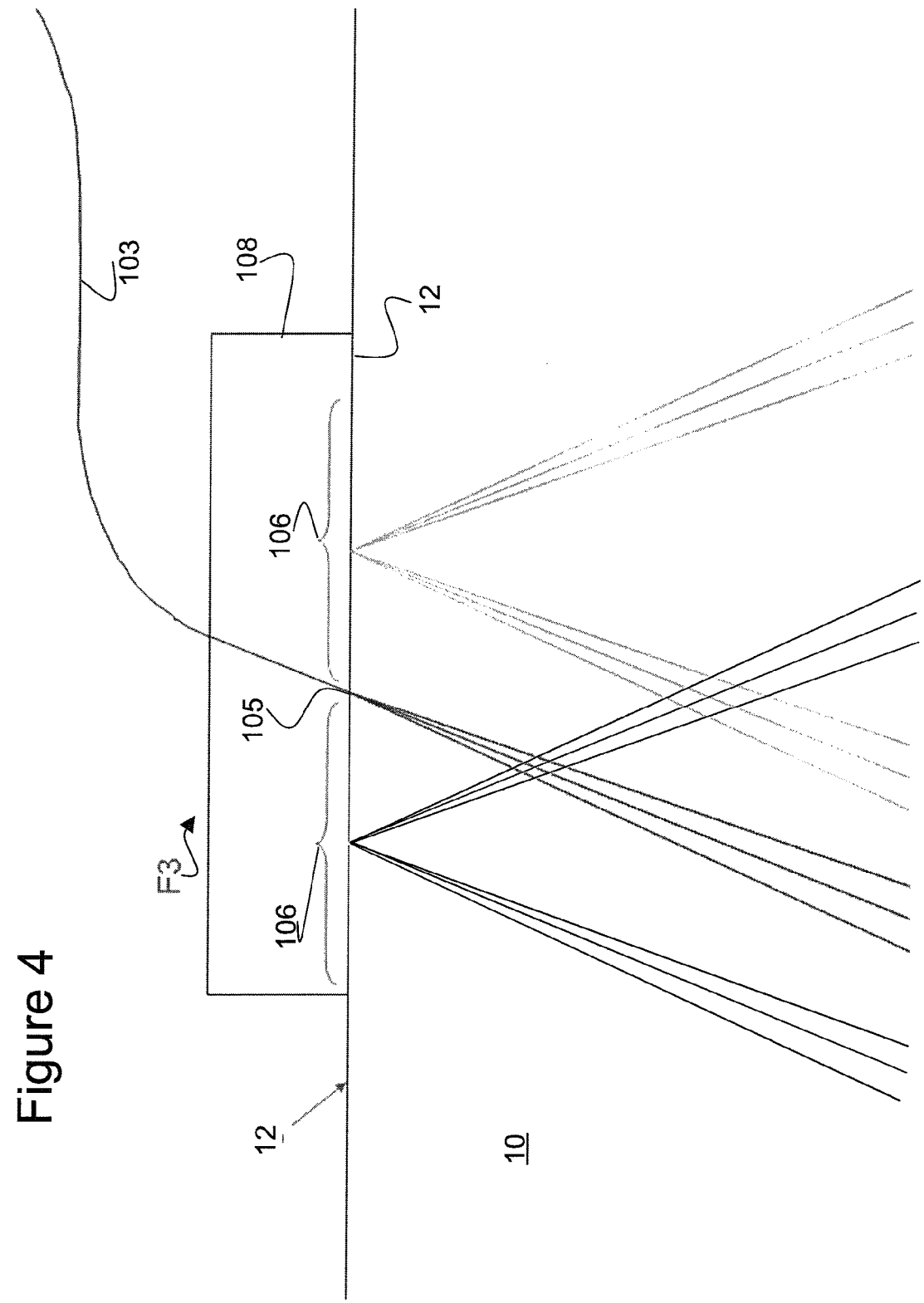
FIG. 4 is a detailed view of a reflector at the chip edge of the device of FIG. 3 including the add/drop port.
Figure 5:
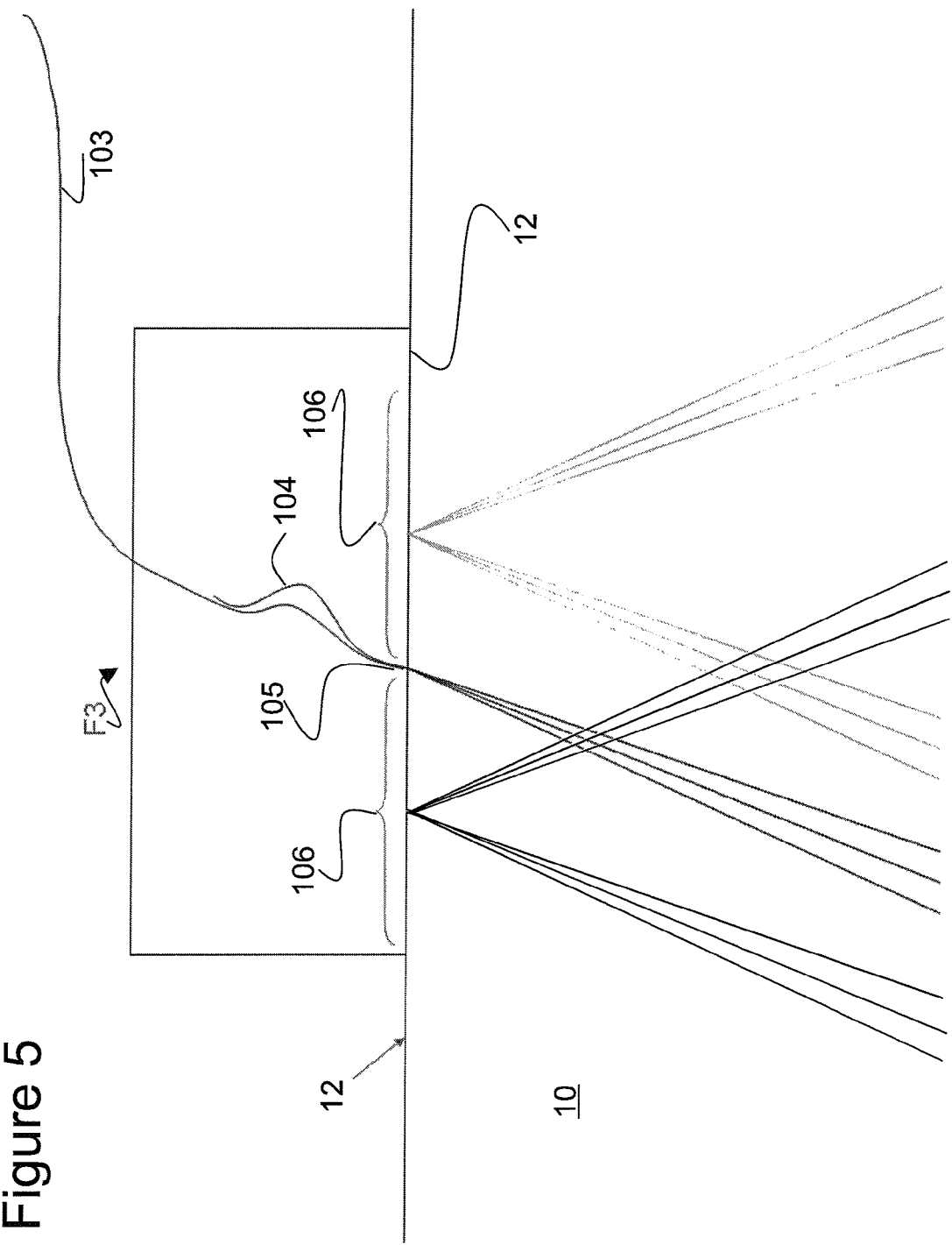
FIG. 5 is a detailed view of an alternate reflector at the chip edge of the device of FIG. 3, including a Mach-Zehnder coupler in the add/drop port.

The required functionality is then realized in the coupling to the ADD/DROP fiber 103 at F3, as shown in detail in FIG. 4, where the incident angles of the focused fields have been exaggerated. Depending upon the desired passband characteristics for the ADD/DROP path, the ADD/DROP fiber, presumably an SMF fiber, can be either:

directly located at the focal plane 12 of the chip (if Gaussian passbands are desired, and the mode size is matched to the PLC chip outputs);

spliced to a thermally-expanded core fiber (if Gaussian passbands are desired, but the required mode size is larger than standard SMF);

coupled to a multi-mode waveguide, with the ADD/DROP reflector structure 108 representing a PLC chip (if flat passbands are desired and lowest loss is not important); or coupled to a Mach-Zehnder coupler 104, or some other realization of a chip interface in which the focus shifts with wavelength, with a free spectral range equivalent to a channel spacing, as shown in FIG. 5 (if flat passbands are desired and lowest loss is important).

Because lowest loss is desired for the EXPRESS path, the regions 106 of the reflector structure 108 of the ADD/DROP port F3 are mirrored, while a transmissive window 105 provides coupling to the input waveguide 103. Hence the need for telecentricity in the imaging system, as will be described in detail below. The tuning mechanism for selecting an optical channel is the process of moving the ADD/DROP reflector structure 108 transversely, so that the transmissive window 105 is aligned with the wavelength corresponding to the desired channel center of the spatially separated and focused wavelength channels.

In one embodiment, the ADD/DROP reflector structure 108 of the ADD/DROP port F3 is reciprocated by a flexure structure in which the output fiber 103 and reflective surface 106 of the reflector structure 108 at F3 rests on a platform supported by two flexure extensions, and are pushed normal to those flexures, resulting in almost pure translation (without rotation) along the intended direction (not shown)

The fields exiting the pupils AO1 and AO2 would come to a virtual focus within the chip 10 along a Rowland circle, as shown in FIG. 6A. The dashed lines represent chief ray trajectories (i.e. rays from the center of a pupil to the center of the focused spot at the output) for 3 such wavelength components. For the EXPRESS paths, it is desired that what emanates from one pupil will, for all wavelengths not corresponding to the ADD/DROP channel, reflect from a plane mirror 106 at the focus 12. However, this would require that the chief rays are incident at equal but opposite angles from that mirror normal. It is clear from inspection of FIG. 6A that this can only be possible for one wavelength, not all wavelengths. What is required for this to be true of all wavelengths is the presence of a lens M (roughly classifiable as a field lens), as suggested in FIG. 6B. This lens M straightens the chief rays from each sub-pupil so that they are incident at equal but opposite angles from the mirror 106 normal for all wavelengths, as required. Thus what enables a nearly monolithic functionality is the implementation of a field lens in the form of curved mirror structures M1, M2, M3.

I claim:

1. A tunable add/drop filter in a planar lightwave circuit (PLC) comprising:

an input port for launching an input optical signal comprising a plurality of wavelength channels into the PLC;

a demultiplexer with an input pupil and an output pupil for spatially separating the input optical signal into the wavelength channels;

a slab waveguide region comprising a high-index core layer, surrounded above and below by lower-index cladding layers for transmitting the separated wavelength channels from the demultiplexer to an add/drop port;

a lens system in the slab waveguide region for focusing the plurality of separated wavelength channels from the output pupil of the demultiplexer onto straight line at an edge of the PLC, a separate reflector adapted for transverse movement along the edge of the PLC for reflecting the separated wavelength channels;

an add/drop port within a transmissive window within the reflector for receiving one or more of the separated wavelength channels as a drop port, or for inputting a new wavelength channel as an add port, the add/drop port being tunable as a function of transverse motion of the transmissive window along the separated wavelength channels focused at the edge of the PLC;

a multiplexer with an input pupil optically coupled with the reflector and the add/drop port for receiving and multiplexing the one or more wavelength channels reflected by the reflector and any new wavelength channel input at the add port from the lens system in the slab waveguide region, and an output pupil; and an output port optically coupled to the output pupil of the multiplexer for outputting the multiplexed wavelength channels;

wherein the output pupil of the demultiplexer is positioned with respect to the input pupil of the multiplexer, such that at least one wavelength channel focused on the reflector is optically coupled into the input pupil of the second demultiplexer.

2. A tunable add/drop filter in a planar lightwave circuit (PLC) as defined in claim 1, wherein the first demultiplexer and the multiplexer comprise arrayed waveguide gratings.

3. A tunable add/drop filter in a planar lightwave circuit (PLC) as defined in claim 2, wherein the spatially separated wavelength channels of the first demultiplexer and the multiplexer are in reflective communication along a common circle.

4. A tunable add/drop filter in a planar lightwave circuit (PLC) as defined in claim 3, wherein the common circle comprises a Rowland circle.

5. A tunable add/drop filter in a planar lightwave circuit (PLC) as defined in claim 1, wherein the lens system in the slab waveguide region comprises a telecentric lens system.

6. A tunable add/drop filter in a planar lightwave circuit (PLC) as defined in claim 5, wherein chief rays of each reflected wavelength channel are incident on the reflector at equal angles.

7. A tunable add/drop filter in a planar lightwave circuit (PLC) as defined in claim 1, wherein the lens system comprises at least one reflective surface within a slab waveguiding region, the reflective surface having a curvature to impart optical power.

8. A tunable add/drop filter in a planar lightwave circuit (PLC) as defined in claim 7, wherein the at least one reflective surface is created through a refractive index gradient causing total internal reflection, and all angles of incidence of the separated wavelength channels on the at least one reflective surface are greater than the critical angle for total internal reflection.

9. A tunable add/drop filter in a planar lightwave circuit (PLC) as defined in claim 8, wherein the at least one reflective surface is etched to expose an air interface.

10. A tunable add/drop filter in a planar lightwave circuit (PLC) as defined in claim 7, wherein the at least one reflective surface is etched and metalized.

11. A tunable add/drop filter in a planar lightwave circuit (PLC) as defined in claim 1, wherein the reflector comprises a separate PLC including an add/drop port waveguide disposed in the transmissive window.

12. A tunable add/drop filter in a planar lightwave circuit (PLC) as defined in claim 11, wherein the add/drop port waveguide comprises a Mach-Zehnder interferometer.

* * * * *

UNITED STATES PATENT AND TRADEMARK OFFICE
CERTIFICATE OF CORRECTION

| | | |
|---|---|---|
| PATENT NO. | : 7,889,991 B2 | Page 1 of 1 |
| APPLICATION NO. | : 12/029322 | |
| DATED | : February 15, 2011 | |
| INVENTOR(S) | : Ranalli | |

It is certified that error appears in the above-identified patent and that said Letters Patent is hereby corrected as shown below:

Col. 6, line 53, "second demultiplexer" should read -- demultiplexer --

Col. 6, line 55, "wherein the first demultiplexer" should read -- wherein the demultiplexer --

Col. 6, line 59, "channels of the first demultiplexer" should read -- channels of the demultiplexer --

Signed and Sealed this
Twenty-sixth Day of July, 2011

David J. Kappos
*Director of the United States Patent and Trademark Office*